(12) United States Patent
Lloyd-Jones

(10) Patent No.: US 6,931,509 B2
(45) Date of Patent: Aug. 16, 2005

(54) ADDRESS MAPPING IN SOLID STATE STORAGE DEVICE

(75) Inventor: Kevin Lloyd-Jones, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/734,624

(22) Filed: Dec. 15, 2003

(65) Prior Publication Data

US 2004/0128468 A1 Jul. 1, 2004

Related U.S. Application Data

(63) Continuation of application No. 09/959,590, filed as application No. PCT/GB01/00643 on Feb. 19, 2001, now Pat. No. 6,728,860.

(51) Int. Cl.$^7$ .............................................. G06F 12/00
(52) U.S. Cl. ...................... 711/206; 711/209; 711/213; 711/217; 711/221; 714/8; 714/710
(58) Field of Search ........................... 365/185.09, 200, 365/225.5, 230.03, 231, 238.5; 711/243.5, 203, 205–9, 213, 217, 221; 714/8, 710, 752

(56) References Cited

U.S. PATENT DOCUMENTS

| | | |
|---|---|---|
| 5,359,570 A | 10/1994 | Hsu et al. |
| 5,404,485 A | 4/1995 | Ban |
| 5,638,334 A | 6/1997 | Farmwald et al. |
| 5,749,091 A | 5/1998 | Ishida et al. |
| 6,115,785 A | 9/2000 | Estakhri et al. |
| 6,212,647 B1 | 4/2001 | Sims, III et al. |
| 6,249,884 B1 | 6/2001 | Joo |
| 6,345,368 B1 | 2/2002 | Bergsten |
| 6,393,513 B2 | 5/2002 | Estakhri et al. |
| 6,445,613 B1 | 9/2002 | Nagai |
| 6,470,461 B1 | 10/2002 | Pinvidic et al. |
| 6,477,616 B1 | 11/2002 | Takahashi |
| 2001/0002488 A1 | 5/2001 | Sims et al. |
| 2001/0014039 A1 | 8/2001 | Longwell et al. |
| 2001/0017798 A1 | 8/2001 | Ishii |

FOREIGN PATENT DOCUMENTS

WO 99 38066 A 7/1999

OTHER PUBLICATIONS

Sakalay, "Address skip—a means for utilizing imperfect storage," *IBM Technical Disclosure Bulletin*, pp. 1841–1842, Oct. 1, 1977, vol. 20, No. 5.

*Primary Examiner*—Christian P. Chace

(57) ABSTRACT

There is disclosed a method and apparatus for mapping between logical and physical addresses in a solid state data storage device, particularly but not exclusively a magnetic random access solid state data storage device, in which a list of mappings between ranges of logical addresses and ranges of physical addresses are stored in a data table, the mappings being operated on to look up a physical address from a logical address and vice versa, and being operated on by a data processor, to amend the data mappings by introduction of new ranges of logical and physical addresses, upon ranges of individual physical memory elements becoming defective.

7 Claims, 9 Drawing Sheets

<Block address> <Segment address>
<Column 1 Row address > <Column 2 Row address>....

Fig. 4

Now Assume 5690..5699 Turn Bad

| Logical Address | Physical Address |
|---|---|
| 0 | 0 |
| 8 | 21 |
| 1002 | 5684 |
| 1008 | 111000 |
| 1018 | 5700 |
| 10000 | 25682 |

Fig. 5

Now Assume Addresses 5684 to 5693 Turn Bad

| Logical Address | Physical Address | Index |
|---|---|---|
| 0 | 0 | 0 |
| 8 | 21 | 1 |
| 1002 | 111000 | 2 |
| 1012 | 5694 | 3 |
| 10000 | 25682 | 4 |

Fig. 8

ADDRESS MAPPING IN SOLID STATE STORAGE DEVICE

This application is a continuation of U.S. application Ser. No. 09/959,590 filed Dec. 21, 2001 now U.S. Pat. No. 6,728,860 which is a 371 of PCT/GB01/00643 Feb. 19, 2001.

FIELD OF THE INVENTION

The present invention relates to the field of data storage, and the addressing of memory storage elements, particularly although not exclusively within a solid state array of magnetic random access memory elements.

BACKGROUND TO THE INVENTION

Conventional solid state random access memory devices are dominated by silicon dynamic random access memory (DRAM) devices which comprise a silicon substrate having a plurality of doped silicon layers into which are formed a plurality of memory elements, typically field effect transistors. Such memory devices are common in many applications for storage of volumes of data up to tens of megabytes, and have an advantage of relatively quick access times.

For storage of larger volumes of data, of the order of Gbytes upwards, rotating disc drives are common, but have reduced access times compared to silicon dynamic random access memory chips.

As well as the above prior art types of memory storage device, there is being developed by the assignees a class of solid magnetic random access memory (MRAM) storage components comprising a two-dimensional array of magnetic memory elements fabricated on top of a silicon substrate. Typically, each individual MRAM component may store between 32 megabytes, and 256 megabytes of data. Data is stored by first presenting the component with a segment address to identify where within the component the data is to be stored. Each MRAM component comprises a plurality of MRAM elements, which are cells within the component capable of storing a single bit of information. A plurality of MRAM components can be assembled into a MRAM device. Within a MRAM component, a plurality of MRAM elements are arranged into an MRAM segment sharing a common address. A segment is the minimum quantity of data which can be stored to or retrieved from an MRAM component Due to the cost of MRAM components, they may be used in applications where a conventional silicon dynamic random access memory (DRAM) is too small, but a conventional hard disk solution is too slow.

Problems found in MRAM components include:

MRAM components yield a physical address range which is not a power of two. An MRAM device comprising an array of MRAM components will therefore yield a non-contiguous physical address range.

A number of segments within each storage component of a MRAM device is not a power of two, which means a block address cannot be directly presented onto a binary signal row/segment address bus.

Each MRAM component may have numerous manufacturing defects which render many of its segments unusable.

MRAM component may degrade during their life so that further segments become unusable.

It could be arranged that the physical addresses of the MRAM components are overlapped, such that a contiguous physical address range is provided, however this has a disadvantage of trading off other performance aspects of an MRAM device.

In the field of silicon random access memories, the problem of individual defective memory storage elements in a two dimensional array of memory storage elements is known. In U.S. Pat. No. 5,862,314 there is disclosed a computer system having a memory requester component which interfaces with a memory module. An error map which identifies a defective memory portion of the memory module is created and is stored in the computer system. Using this error map, a re-mapping table is provided which maps each of a plurality of defective memory portions to a non-defective memory portion in the memory module. When access to a requested portion of the memory module is made, the nor map is used to determine whether the requested memory portion in the memory module is on of a plurality of defective memory portions. If the error map indicates that the requested memory portion is one of the defective memory portions, then a determination is made from the re-mapping table, of a non-defective memory portion to which the requested memory portion is mapped.

In that scheme, each requested memory address contained in the request made by a computer is mapped to the corresponding respective physical memory address of the memory module, where that physical address contains non-damaged memory elements. However, where damaged memory elements are provided, the data destined for the physical addresses of those defective memory elements is re-directed to a redundant array of memory elements provided specifically for the purpose. In that known scheme, correctly operating memory elements do not have their physical addresses re-mapped. Defective memory elements retain their physical address, but the request for that physical address is re-mapped onto a new correctly operating memory element provided in a redundant array of memory elements. In the case of U.S. Pat. No. 5,168,324, an error map is used which effectively stores addresses of bad locations in the memory array and offers a substitute address. Methods such as disclosed in U.S. Pat. No. 5,168,324 have been known in hard disk drive technology for many years.

In U.S. Pat. No. 5,359,570, them is disclosed a solid state data storage device which receives a logical address from a computer system and provides a mapping to a physical address on a data storage device. Through use of a mapping between logical and physical addresses, defective sectors in a memory unit can be mapped out and fresh unused defect free sectors replace the defective sectors, automatically and without user intervention. In an address map between physical and logical addresses, each logical sector in it contains a physical address. There is created a defect map, which maps addresses of individual defective data storage elements in the memory array. A logical to physical address map provides a unique one to one mapping between logical and physical addresses, with any defects in the physical memory array being taken care of by a physical defect map which re-maps logical addresses to new physical addresses in a redundant army of memory elements to replace the defective memory elements in a main array.

Each of the above two disclosures address a similar problem in using a prior art solid data storage device, effectively as a substitute for a hard disc drive device. In each of the above disclosures, the mapping of logical to physical addresses is provided on a per chip basis. In each of the above two disclosures it is required that a separate redundant army of memory elements is provided in addition to a main array of memory elements.

Each of the above two devices address only the problem of defect avoidance. Neither of the above two disclosures address the problem encountered when discontinuities appear in ranges of physical addresses.

In the case of U.S. Pat. No. 5,359,570, instead of using an error map, an address translator device is used where a logical address is fed into one side, and a physical address is addressed at another side. The defect map data is stored in the actual memory device itself, using up part of the memory. In theory, such a system could be used to avoid address discontinuities, however a disadvantage of this scheme is that it involves a one for one mapping between individual logical addresses and individual physical addresses, which is very memory intensive. Using the method disclosed in U.S. Pat. No. 5,359,570, an address translation data storage table can become impractical and non-scaleable and is therefore suitable only for small numbers of physical memory addresses. The amount of memory capacity required to store the address mapping data table in the address translator is approximately 0.5% of the size of the memory which the address table is used with. This scheme is unsuitable for application for large memory capacities as are found in MRAM devices.

SUMMARY OF THE INVENTION

Specific implementations according to the present invention aim to address the problem of non-contiguous sets of addresses in a data storage device, particularly although non exclusively a magnetic random access memory data storage device.

Specific implementations according to the present invention also aim to address the problem of unavailability of physical addresses due to defects on individual memory elements within a data storage device comprising a plurality of memory elements, particularly although not exclusively an array of magnetic random access memory elements.

According to one aspect of the present invention there is provided a data storage device comprising:

a plurality of arrays of physical memory storage elements each having a corresponding respective physical address each said memory storage element capable of storing at least one bit of data; and address conversion means for converting between a plurality of logical addresses and a said plurality of physical address;

wherein said address conversion means comprises at least one memory area storing address translation data describing a range of logical addresses, and for each said range of logical addresses a corresponding respective range of said physical addresses.

Preferably said address translation data comprises:

a plurality of data entries, each describing the first physical address of a plurality of contiguously addressed physical memory elements, said physical address data being specified in terms of a block address data describing a block of physical address, and each describing at least one logical address corresponding to sold physical address;

a row address data describing a row of individual memory components, each sold memory component comprising an array of a plurality of said memory elements; and a segment address data, said segment address data specifying a segment of each of a plurality of segments of a plurality of said components, wherein a relationship between adjacent data entries defines ranges of said logical addresses.

Said address translation data may be stored at least once within said memory storage elements of said data storage device.

Preferably said plurality of arrays of memory storage elements comprise a plurality of individual memory storage components, each comprising a corresponding respective said array of memory elements, the plurality of memory components arranged in a component array on a circuit board, and connected together by a common physical address bus.

Preferably said address translation data comprises a plurality of data entries each defining a relationship between a said logical address and a said physical address. Entries are ordered such that entry N+1 will have a higher logical address than entry N.

Suitably, the memory storage elements comprise magnetic random access memory elements.

According to a second aspect of the present invention there is provided a method of converting between a logical address of a data storage device, and a physical address corresponding to individual memory elements within said data storage device, said method comprising the steps of;

(i) swing in a data translation table, address data describing a plurality of logical addresses and a plurality of said physical address, wherein each said logical address corresponds to a respective physical address and is assigned an index value;

(ii) reading logical address request data describing a logical address of data to be retrieved;

(iii) reading said stored address data and comparing said read logical address with a said stored logical address data at a first said index value;

(iv) if said logical address to be retrieved is greater than or equal to a look up logical address corresponding to said index of said data entry, incrementing said index value;

(v) repeating steps (ii) to (iv) above; and (vi) determining a physical address corresponding to said logical address to be retrieved, as being the sum of the physical address of the previous data entry and the difference between the logical address to be retrieved and the logical address of the previous data entry.

The invention includes a method of interfacing a data storage device comprising an array of a plurality of memory elements, with a logical address bus on which a plurality of logical address data is carried for identifying data stored in said memory device, said method comprising the steps of:

storing a data translation table comprising a plurality of data entries, each said data entry comprising, a look up logical address value being a logical address stored in said data translation table and a look up physical address value, said look up physical address value corresponding to a physical location of one or more said memory elements;

upon receipt of a requested logical address, parsing said data entries in said data table, to read a look up logical address of each of a plurality of said data entries;

comparing said look up logical address with said requested logical address;

if a said look up logical address is less than said requested logical address, continuing to parse said data translation table;

if said look up logical address is less than or equal to said requested logical address, determining a corresponding respective physical address to said requested logical address as being said logical address, minus a look up logical address of a preceding data entry in said data translation table, plus a look up physical address corresponding to said preceding data entry in said data translation table.

According to a third aspect of the present invention there is provided a method of interfacing a data storage device comprising an array of a plurality of memory element, with a logical address bus on which a plurality of logical address date is carried for identifying data stored in said memory device, said method comprising the steps of:

storing a data translation table comprising a plurality of data entries, each said data entry comprising a logical address value and a physical address value, said physical address value corresponding to a physical location of one or more said memory elements;

detecting at least one defective memory element;

locating a pair of entries within said data translation table which define a range of physical addresses encompassing the address of the defective memory element;

inserting two additional entries in said data translation table between said pair of entries;

creating a first additional data entry in said data translation table, said first additional data entry comprising a logical address which corresponds to the first defective element of the group of defective elements and a physical address being that of a group of previously unused (spare) storage elements;

creating a second additional data entry is said data translation table, said second data entry comprising the logical address corresponding to the physical address subsequent to the highest addressed element of the group of defective elements and that same physical address as the physical address.

BRIEF DESCRIPTION OF THE DRAWINGS

For a better understanding of the invention and to show how the same may be carried into effect, them will now be described by way of example only, specific embodiments, methods and processes according to the present invention with reference to the accompanying drawings in which:

FIG. 4 illustrates schematically a format of an address data stored in a data translation table of the memory storage device of FIG. 1 herein;

FIG. 5 illustrates schematically a set of data entries in a data translation table of the data storage device of FIG. 1 herein, having indexed data entries relating logical addresses with physical addresses;

FIG. 8 illustrates schematically a modified data table having an additional indexed data entry as a result of a block of physical memory elements becoming defective, where a physical address of one end of the range of defective memory elements coincides with a prior existing data entry in the data translation table;

DETAILED DESCRIPTION OF THE BEST MODE FOR CARRYING OUT THE INVENTION

Figure 1:
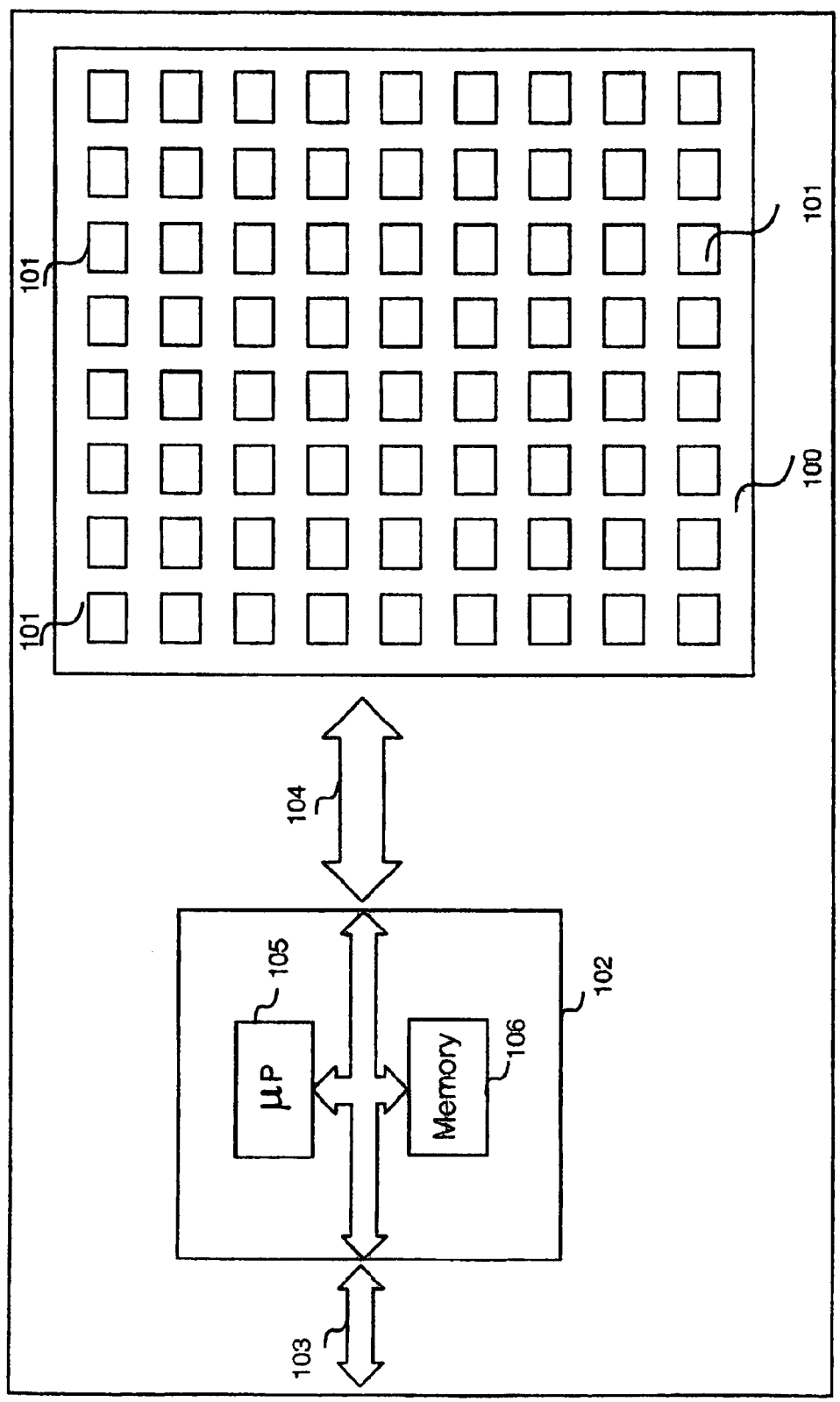
FIG. 1 illustrates schematically a memory storage device comprising an array of memory storage components, each containing an array of magnetic random access memory data storage elements, addressed through an address translator device.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

An address translation scheme aims to convert block addresses to appropriate row/segment addresses. A translation table holds numerous associations, each containing the following information:

<block address><segment address><row address one><row address two>

A number of row addresses will equal a number of columns in such a system. The segment address is common to both columns. Contiguous associations are used to specify ranges of addresses in the form:

<2000><9876><3><4>

<5000><12566><2><1> meaning the block addresses 2000 through 4999 translate into segments 9876 through 12875 at column 1 row 3 and column 2 row 4. The above solution addresses discontinuities and manufacturing defects.

To provide a solution to segment degradation, it is possible during usage that a segment is found to be unable to store data correctly. Using a similar scheme, it can be avoided to use the segment which is unable to correctly store data, by dynamically sparing that segment. This can work if there are unused spare segments available which can be substituted for newly defective segments. A separate table may hold associations describing spare segments.

<2000><9876><3><4>

<5000><12566><2><1>

<1000000><18000><4><4>

<1000100><18200><4><4>

The first pair of associations specify a genuine block address range. The second pair of associations specify a range of spare blocks and are held in the spare tables.

If block 3000 were found to be bad (segment address 10876) then after sparing, the tables would be as follows:

<2000><9876><3><4>

<3000><18000><4><4>

<3001><10877><2><1>

<5000><12568><2><1>

<1000001><18001><4><4>

<1000100><18200><4><4>

A block of segments from the spares table were used for block 3000 and two new entries had to be made in the translation table, one to skip to the spare and the other for addresses following the spare.

There are numerous compromises to be made when organizing translation and sparing tables. The above examples use a common segment address and multiple column row address. It is possible to have common segment and row addresses if as a design option it is prepared to trade the ability to select different rows of components against translation table width. It is possible to have multiple segment and multiple column row addresses if as a design option, one is prepared to pay a higher price in translation table width to gain more translation flexibility. The configuration of a translation table is highly dependent on the distribution of the defects in the storage components.

In the likely event of the sparing and translation tables being held in a volatile memory for speed of access, their preservation in non-volatile memory becomes essential. These tables along with other storage system specific data may be stored in numerous pre-assigned blocks. Appropriate entries in the translation table would guarantee that these blocks are neither mapped as spares nor for data storage.

A formatting algorithm is preferred. Such an algorithm may determine the location of unusable segments and generate optimal translation and sparing tables, The algorithm matches ranges of good contiguous addresses between columns such that a minimal number of translation and sparing table entries are required. This algorithm may make compromises due to restrictions on the translation/sparing table size and the fact that space must be left in the translation table for dynamic sparing.

In the event of the translation table filling, a dynamic format may be implemented that would re-format the device without loss of data. This would be done by shuffling data between block addresses in order to eliminate pairs of aliases that have been used to skip bad blocks.

Referring to FIG. 1 herein, there is illustrated schematically a solid state data storage device according to first specific embodiment of the present invention. The data storage device comprises a component card 100 upon which are mounted an array of a plurality of individual data storage components 101 arranged in a plurality of rows and columns; and an address translator 102 for converting between a logical address carried on a logical address bus 103, and a physical address carried on a physical address bus 104 connected between the address translator and the array of memory storage components. Additionally, the data storage device has a data bus (not shown) for transferring data into and out of the device.

Each individual memory component comprises a magnetic random access memory (MRAM), which comprises a substrate chip, which in the best mode is of silicon, and comprises a plurality of drive transistors connected to an array of parallel bit lines and an array of parallel word lines extending transversely to the plurality of bit lines, for reading and writing to a plurality of magnetic memory elements. Each memory element is positioned at a corresponding respective intersect between a said word line and a said bit line. Each individual memory element has its own unique physical address within the component which is accessed by an array of word line read and write drive transistors and an array of bit line read/write drive transistors.

Due to unavoidable manufacturing defects of the MRAM component, individual magnetic memory elements within the component may be defective. In general, data cannot be read from or written to individual memory elements which are defective. For interfacing with a data processor device or other data storage devices, there is an advantage in having a continuous uninterrupted set of logical addresses. However, because some of the memory elements are defective, there are physical addresses to which data cannot be read from or written to. Because there are physical addresses corresponding to individual memory elements which are unavailable for usage, it is not possible to have a set of contiguous logical addresses uniquely mapped on to a set of contiguous physical addresses.

The data storage device has the problems that firstly, the address space of the array of memory storage elements is both non-contiguous, that is to say there are gaps in the sequence of physical addresses, which are unavailable for usage, and secondly, there are individual memory elements which are unavailable, because of malfunction.

The basic function of the address translator 102 is to convert between a logical address and a physical address. A logical address is carried over logical address bus 103, and converted to a physical address which is carried over physical address bus 104 for addressing the array of memory components. The address translator 102 stores in an internal memory, a data table containing a mapping between a plurality of logical addresses, and a plurality of physical addresses.

In this specification, the term "logical address" is used to describe an address assigned to a block of data, which is independent of where the data is stored physically.

A physical address value in the data translation table specifies the location of a single 'block' of memory elements, where a block is a quantity of data specified by a logical address. Adjacent entries in the data translation table define a range of logical addresses whose corresponding physical addresses are contiguous, starting at the physical address specified by the first entry and of size equal to the difference between the logical addresses of the second and first entries.

Figure 2:
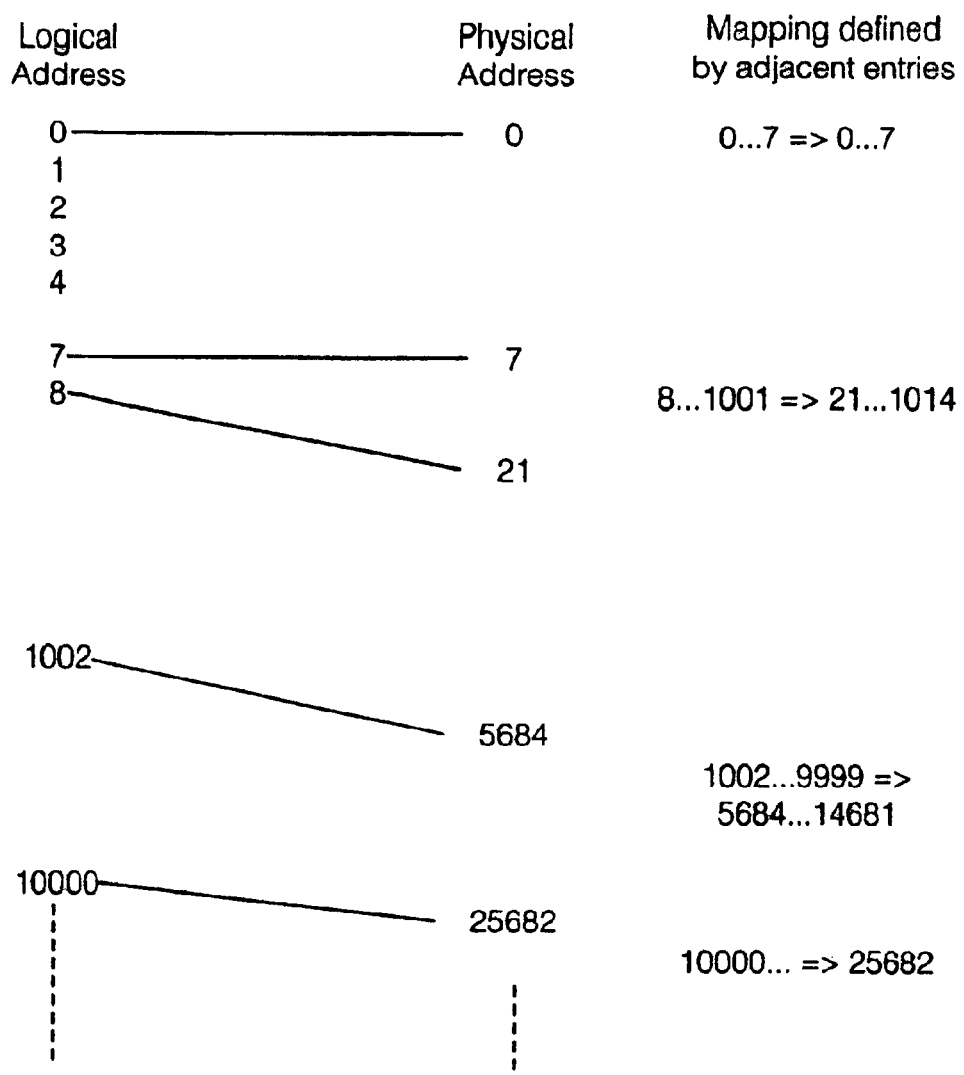
FIG. 2 illustrates schematically a data table for mapping between a plurality of logical addresses and a plurality of physical addresses, where each physical address corresponds to an address of a memory storage element.

Referring to FIG. 2 there is illustrated schematically an address mapping between a set of logical addresses specified upon logical address bus 103 and a set of physical addresses in the memory storage device, specified on physical address bus 104. In the example of FIG. 2, logical addresses 0 through 7 are mapped to corresponding respective physical addresses 0 through 7. However, physical addresses 8 through 20 are unavailable, since the corresponding respective memory elements in the data storage device are unavailable for usage. Therefore physical addresses 8 through 20 do not have a corresponding respective logical address. Logical addresses 8 through 1001, are mapped at corresponding respective physical addresses 21 through 1014. However, physical addresses 1015 through 5683 are unavailable for usage. Therefore, logical addresses 1002 through 9999 are mapped onto corresponding respective physical addresses 5684 through 14681. Physical addresses 14682 through 25681 correspond to damaged memory elements and are therefore unavailable. Therefore, logical addresses 10000 onwards are mapped onto corresponding respective physical addresses 25682 onwards. It will be appreciated by the person skilled in the art that this is only one example of individual physical addresses which are unavailable, and in the general case, any individual physical address may be unavailable due to memory element defects.

In the address mapping table of FIG. 2, there is provided a continuous series of logical addresses, each of which is mapped to a corresponding respective physical address. The physical addresses may be continuous in the case of zero defects, but in the general case physical addresses are non-continuous having gaps in the sequence of address numbers.

Figure 3:
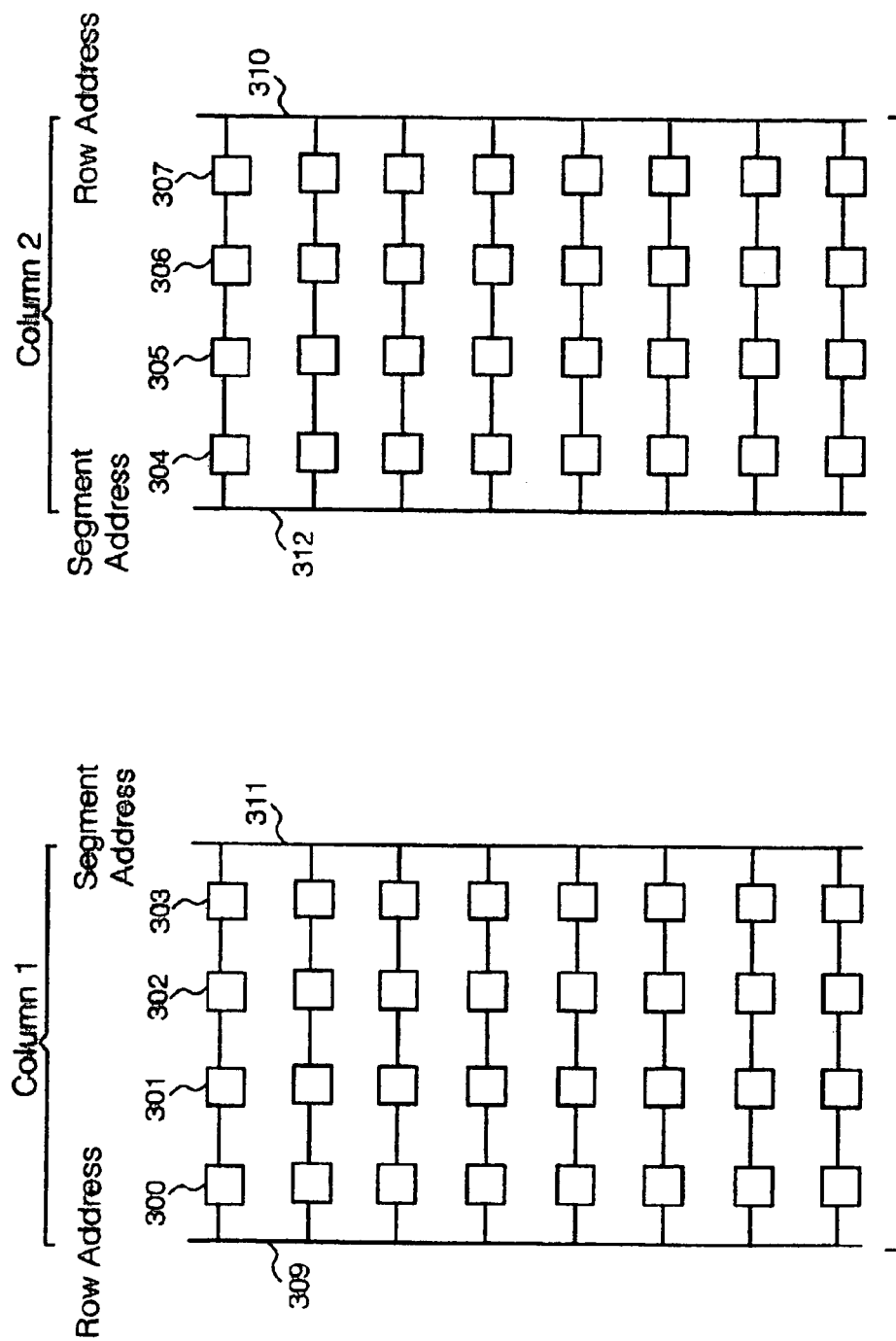
FIG. 3 illustrates schematically a physical addressing scheme of the plurality of individual memory components in an MRAM data storage device.

Referring to FIG. 3 herein, there is illustrated schematically a plurality of components on a circuit board arranged into two columns each of eight rows, with four components per row. Addressing of individual memory elements in the array of components is made by specifying a row in each column, and specifying a segment of a component, which is the same for each component. Combined parallel access to the rows of both columns mean that eight segments from eight components may be accessed simultaneously. A smallest addressable amount of data which the storage system allows is one block, which is equal to the sum of the paralleled components in the storage array.

When the memory device is addressed, a first row of memory elements in the first column, 300–303 may be addressed along with a second row of components from the second column 304–307. Row addresses are carried on first and second row address lines 309, 310 for the first and second columns respectively. Additionally there are provided first and second segment address buses 311, 312 respectively. A row address addresses a row of individual components on a data storage device. A segment address addresses a particular address within a component.

Row and column elements of the address specify individual components within the array of components. A full physical address would involve selecting a pair of columns, a selection of which row of components within a column are required, and a single segment address being fed into each of the components in the row of components. Eight segments, one in each of the selected components, are accessed in parallel. This is the smallest amount of data that may be accessed and is known as a block. The data capacity of the block of date may be of the order of 2K Byte, but is an implementation specific detail and may be varied from device to device, but would be expected to be in the range of 1 to 4 K Byte typically. Faster read/write performance can be obtained by addressing more components at a same time in an address. For example, instead of addressing 8 components at a time, a faster performance device in terms of retrieval of a pre-determined block of data, may address 16 components at a time.

The address translator column, row and segment address give an input logical address. A logical address addresses 1 logical block of data.

It will be appreciated by those skilled in the art that the addressing scheme may be varied, depending upon the topography of the memory storage device, for example whether there are 2 columns, 4 columns, and how many rows there are in each column. The addressing scheme disclosed herein is adaptable to suit a variety of architectures of data storage devices.

The addressing scheme disclosed herein may be able to accommodate defective rows of components, additionally, there will be natural discontinuities in the physical address range provided by a data storage device. For example, a first column of rows of components may have an address range 0 to 24 Mb whereas a second column of rows of components may have an address range 32 MB to 56 Mb.

The addressing scheme allows the following advantages:
Address discontinuity avoidance
Defect avoidance in manufacturing
Storage of translation data such that it does not get mapped to a logical address In general, the data table needs to accommodate a logical address to physical address mapping which overcomes the following problems:

The number of segments within each storage component is not a power of two, which means a block address cannot be directly presented into the row address bus and segment address bus, which are in general binary.

Each component may have numerous manufacturing defects which may render one or more of its segments unusable.

Each component may degrade during its life, such that further segments of the component become unusable.

According to the best mode implementation of the present invention, an address translation method is provided for converting logical addresses on logical address bus 103 which are received in the form of block addresses, into physical addresses which are carried on physical address bus 104, which are specified in terms of rows and segments. Mappings between logical addresses and physical addresses are stored in the data table in the memory of the address translator 102. The data table holds numerous associations between logical and physical addresses, each containing information as described with reference to FIG. 4 herein. That is to say each association contains data describing a block address, and data describing a segment address, a first row address, a second row address, a third row address and so on, up to a number N row addresses, where the number of row addresses is equal to the number of columns in the data storage device. A segment address is common to each of the columns.

This is applied in the form [segment address] [row address 1] [row address 2] . . . .

Within the translation data table, mapping of logical addresses to physical addresses are specified in an indexed table, such that blocks of logical addresses are mapped onto corresponding respective blocks of physical addresses. Therefore, it is not necessary for each individual logical address to contain a discrete entry in the memory the address translator 102, since the data entries in the translation table data are specified in terms of whole blocks of logical addresses corresponding with whole blocks of physical addresses. Each block mapping is assigned an index number, by means of which the block mapping can be identified.

Herein the term "index" is defined as an index into an address translation table. The index of a date entry is an offset into the translation table of which that data entry is located.

Referring to FIG. 5 herein there is illustrated schematically an example of storage of logical blocks of addresses and physical blocks of addresses, together with their indexations. Each indexation number corresponds to a respective pairing of a logical address block with a physical address block.

Defect avoidance is implemented during manufacture of the device, by locating each individual defective memory element in each individual component using test equipment and setting an initial mapping between logical and physical addresses which avoids defective locations. The initial translation data avoids accessing the defective locations. Typically, the physical address range is larger than the logical address range by a few percent, depending upon the yield of devices which are defect free during manufacture.

The nature of the MRAM devices is that where there are defective elements, these tend to come in regions of the MRAM chip, which corresponds with ranges of physical address, rather than individual physical addresses. Thus, ranges of segments within MRAM devices may need to be avoided by the address translation data table.

For storage of translation data within the data storage device, the address translation scheme cannot be used to identify the physical address location in which that data is stored. The translation data table has to be stored in known physical locations, being duplicated in multiple places throughout the data storage device, to ensure that if the translation data table becomes corrupted, for example through the emergence of a defect, there is a spare copy replicated one or a plurality of times throughout the memory device. The translation data also needs to record the physical memory locations where it is itself stored, and which are therefore not available for use as data storage locations. For example where the data translation is stored at physical address locations 1000, 6000, 11000, that is to say replicated into three versions of itself, then the translation table data itself needs to record the fact that those data locations are reserved for storage of the translation data.

Figure 6:
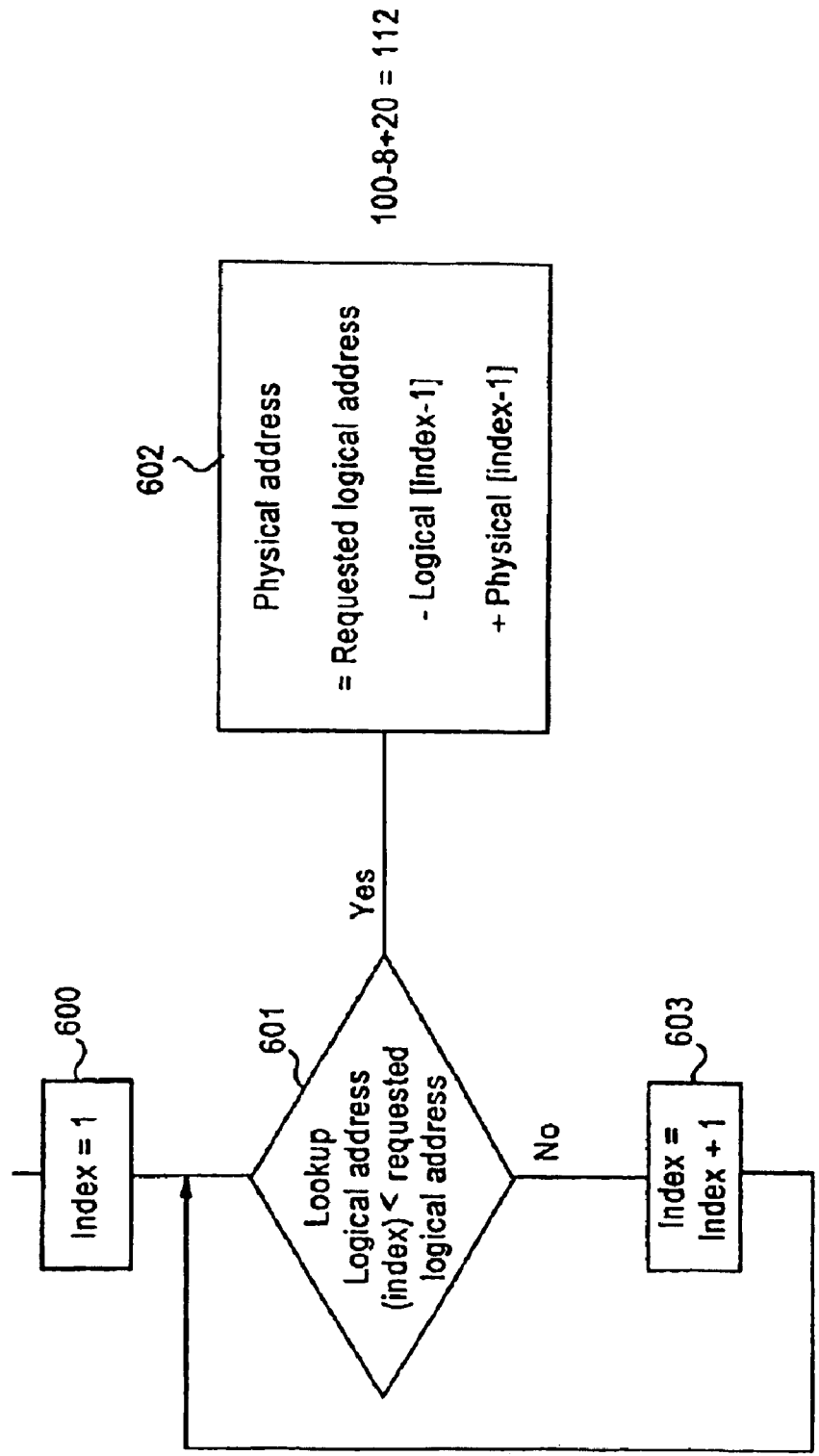
FIG. 6 illustrates schematically algorithmic process steps carried out by the data storage device for translating between a logical address, and a physical address of physical memory storage elements in the data storage device.

Referring to FIG. 6 herein, there is illustrated schematically an algorithm which is applied by microprocessor 105 to the translation data table stored in memory 106 in order to obtain a logical to physical address translation. The content of the translation data table is pre-stored, as a result of defect identification during testing after manufacture. The algorithm of FIG. 6 operates using the data in the translation data table, to get from an input logical address to a corresponding respective physical address for a block of data, as follows.

In step 600, an index data is set to 1. In step 601, the logical address which is to be found, is entered as a parameter to the algorithm, and for convenience is referred to here as the "requested logical address". An initial generated value of the requested logical address is compared with the logical address at index 0, and it is compared whether the requested logical address is less than the logical address of index 0. If this is the case, then in step 602, the physical address is determined as being equal to the requested logical address minus the logical address at the index value minus 1, plus the physical address at the index value minus 1, with the logical and physical addresses at the index minus 1 being determined from the translation data table stored in the memory 106. If the requested logical address is not less than the logical address at the index value, then in step 603, the index value is incremented by 1, and step 601 is repeated in practice, indexation numbers are not stored in the translation table. An indexation number is implied by the location of a data entry within the translation table.

For example using the data translation table as illustrated in FIG. 5 herein, with the example logical address of 100 being entered, for which the corresponding respective physical address is to be found, the algorithm initially looks at index value number 1 and compares in step 601 whether the logical address (which is 8) at that index value is greater than the requested logical address of 100. Since it is not (8 is not greater than 100), the algorithm increments the index value by 1 in step 603, and returns to step 601. The algorithm compares whether the logical address value at index 2 is greater then the requested logical address of 100. In this case, it is (1002 is greater than 100) therefore the algorithm proceeds to step 602 and determines the physical address as the requested logical address (100) minus the logical address at the index minus 1 (i.e. minus 8) plus the physical address at the index minus 1 (i.e. 21) giving a corresponding physical address of 113 for requested logical address 100.

The algorithm illustrated with reference to FIG. 6 will handle translation of logical to physical addresses in all instances from the translation data table. The algorithm will take account of manufacturing defects, and discontinuities within the physical address range.

Figure 7:
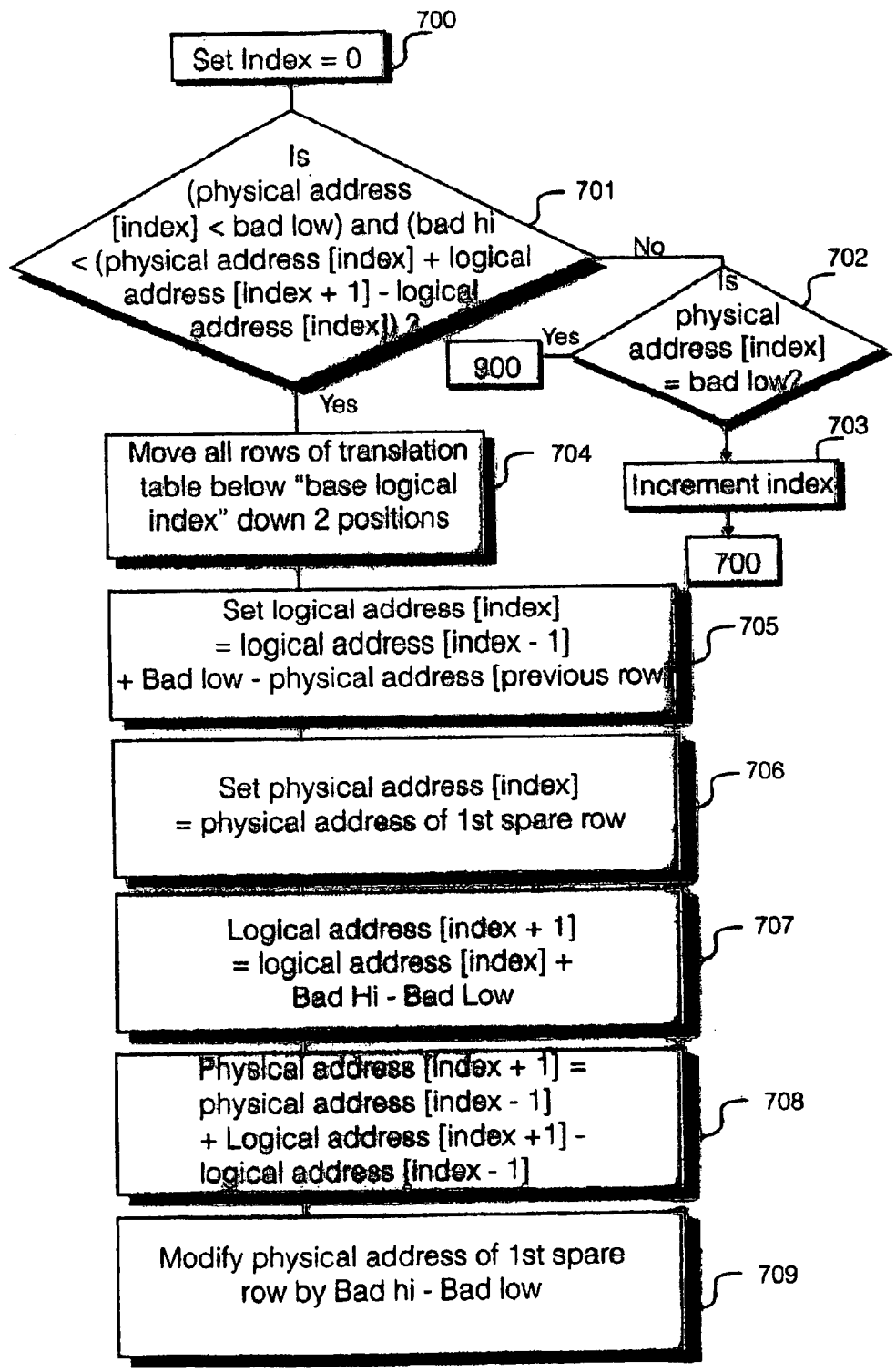
FIG. 7 illustrates schematically process steps carried out by the processor for modifying data entries in the data translation table, to account for a block of memory elements in the data storage device becoming defective.

Referring to FIG. 7 herein, there is illustrated schematically an algorithm which is applied by microprocessor 105 to the translation data in the event of memory elements becoming defective. Herein the term "Badlow" is defined as a lowest bad physical address, the term "Badhi" is defined as a highest bad physical address. A sparing process is applied where one or more components develop defects after manufacture and when in use. The address translation scheme is capable of dynamically changing to avoid new defective locations which occur. The occurrence of defective memory elements becomes known through read/write error checking. For example if data is written to memory elements 5690 to 5700, the data is immediate read back. If the reread data does not correspond with the data which was written, then it can be determined that the memory elements corresponding to physical address locations 5690 to 5700 are defective.

FIG. 5 is the result of the application of the algorithm of FIG. 7 to the table of FIG. 2 where it is assumed that physical addresses 5690 through to 5699 become defective after manufacture and test of the device, and need to be replaced by spare physical addresses corresponding to spare memory elements. Physical addresses 5690 through 5699 correspond to logical addresses 1008–1017, as illustrated with reference to FIG. 2 herein. Therefore, when the memory elements corresponding to physical addresses 5690 to 5700 become defective, logical addresses 1008 through to 1017 become unavailable.

This is remedied by replacing the physical address 5690 corresponding to logical address 1008 with a new physical address 111000, and similarly for all logical addresses corresponding up to and including physical address 5699 which is replaced by physical address 111009. A new entry is made in the data table at index number 2, matching the logical address 1008 to the physical address 111000. The algorithm of FIG. 6, when applied to the modified data table shown in FIG. 5 will provide the mapping from the original logical address 1008 to the new replacement physical address 111000. A second new entry is made in the table after the first new entry such that logical addresses 1018 onwards remain mapped to the physical addresses they were mapped to in FIG. 2. The defective memory locations corresponding to physical addresses 5690–5700 are effectively replaced by spare physical addresses. The data translation table continues to operate on ranges of addresses, rather than on individual data entries for individual addresses.

Referring to FIG. 8 herein, there is illustrated a second example of sparing of defective memory elements, and the modifications to the data translation table of FIG. 2 resulting from the replacement of defective memory elements with redundant memory elements. In the case of FIG. 8, physical addresses 5684 to 5693 are defective. Because this range of defective elements by coincidence extends up to an existing entry in the data translation table, that is to say physical address 5684, there is only required a single addition to the date translation table, by setting at index number 2, a physical address 111000.

Figure 9:
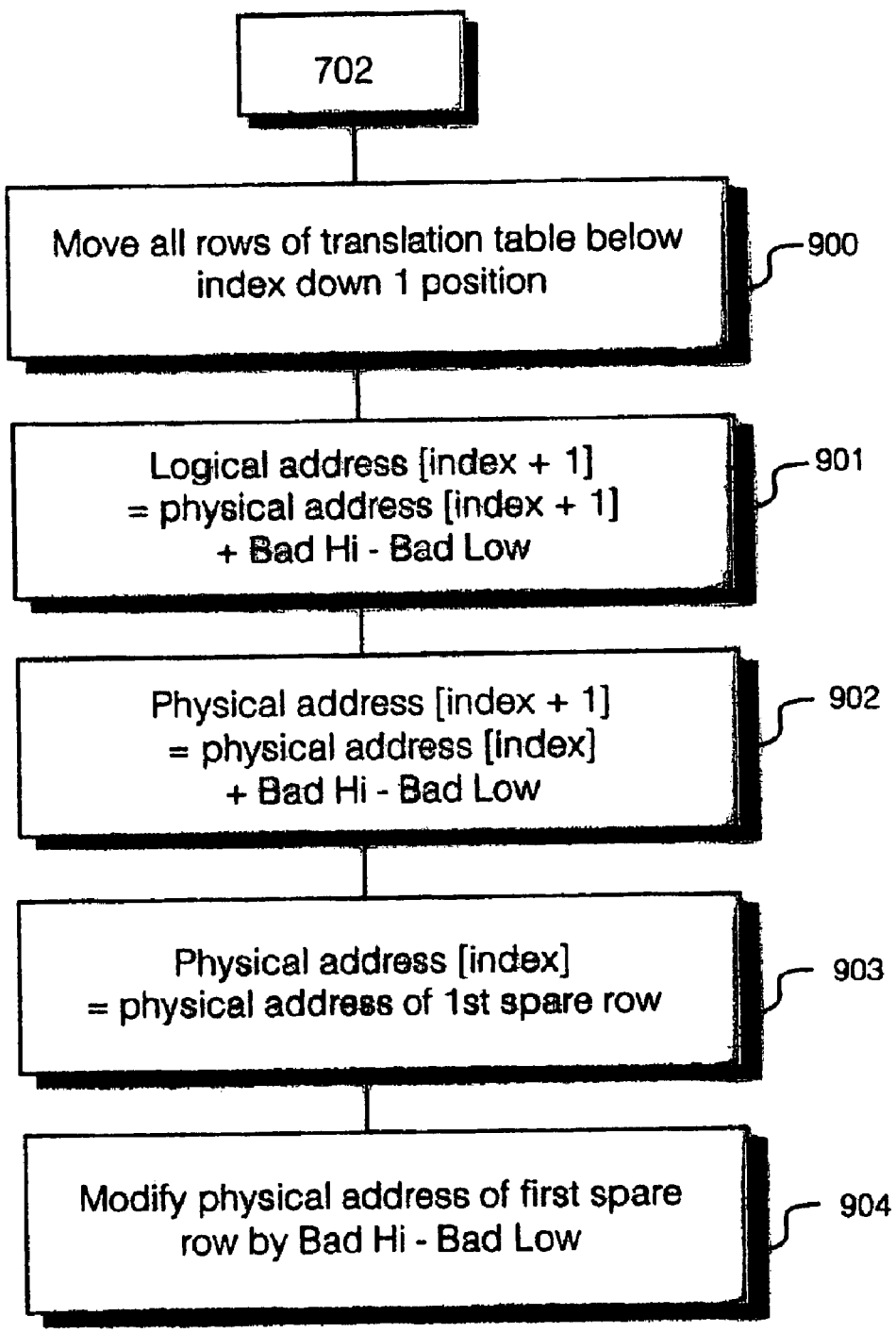
FIG. 9 illustrates schematically algorithmic steps carried out by a processor for modifying the data translation table to produce a single additional data entry as illustrated schematically in FIG. 8 herein.

Referring to FIG. 9 herein, there is illustrated schematically algorithm steps for replacement of the range of defective physical addresses 5684 to 5693 in the data translation table. Referring to FIG. 7 herein, if the condition in step 702 is true then the lowest defective address matches a physical address in the translation table. The algorithm proceeds to step 900. Referring to FIG. 9, steps 900 to 905 modify the translation table to replace the defective elements with spare elements. Step 900 creates a new entry in the translation table below the entry which maps to the defective address. In step 901, the logical address of the new entry is set to the logical address of the element subsequent to the highest defective address. In step 902, the physical address of the new entry is set to the physical address of the elements subsequent to the highest defective address. In step 903, the physical address of the index entry is set as being the physical address of the first spare row. The algorithm then proceeds to step 705 as described previously with reference to FIG. 7.

A further modification to the algorithm of FIG. 7 and the algorithm of FIG. 9 may be made in the case where the spare memory locations are provided in two separate blocks. In this case, a third and/or fourth line entry may need to be made in the data translation table, such that the start and end of a first block of physical addresses of redundant memory elements and a second block of physical addresses and memory elements can be introduced into the date translation table.

Similarly, whilst in the best mode herein, a logical arrangement of a single address table in an address translator has been provided for handling all addresses within a data storage device, the logical architecture of data tables within the address translator is an implementation specific detail, and in the general case for a single memory data storage device, the plurality of physical addresses may be accommodated on a plurality of data tables within one or more address translator devices. Similarly, in a situation where a single address translator device serves a plurality of individual memory data storage devices, a single address data table may serve a plurality of physical addresses extending over the plurality of data storage devices.

Each individual component has its own address interface, and its own address bus on the component card. The exact implementation layout of the plurality of address buses on the component card is a designable feature depending upon the application to which the data storage device is being used. When a physical address is provided into the component card, what is selected is a column and row of a particular device, and an address specifying a row and one or more columns within an individual data storage component.

What is claimed is:

1. A method of interfacing a data storage device comprising an array of a plurality of memory elements, with a logical address bus on which a plurality of logical address data is carried for identifying data stored in said memory device, said method comprising the steps of:
   storing a data translation table comprising a plurality of data entries, each said data entry comprising a look up logical address value being a logical address stored in said data translation table and a look up physical address value, said look up physical address value corresponding to a physical location of one or more said memory elements;
   upon receipt of a requested logical address, parsing said data entries in said data table, to read a look up logical address of each of a plurality of said data entries;
   comparing said look up logical address with said requested logical address;
   if a said look up logical address is less than said requested logical address, continuing to parse said data translation table; and
   if a said look up logical address is less than said requested logical address, determining a corresponding respective physical address to said requested logical address as being said requested logical address, minus a look up logical address of a preceding data entry in said data translation table, plus a look up physical address corresponding to said preceding data entry in said data translation table.

2. Apparatus for converting between a logical address of a data storage device, and a physical address corresponding to individual memory elements within said data storage device, said apparatus comprising:
   a store for storing address data describing a plurality of logical addresses and a plurality of physical addresses, wherein each of said logical addresses corresponds to a respective physical address and is assigned an index value; and
   a processor for:
      (a) reading logical address request data describing a logical address of data to be retrieved;
      (b) reading said stored address data and comparing said read logical address with a said stored logical address data at a first said index value;
      (c) incrementing said index value if said logical address of said data to be retrieved is greater than or equal to a look up logical address corresponding to said index of said data entry;
      (d) repeating steps (a), (b) and (c); and
      (e) determining a physical address corresponding to said logical address to be retrieved as the sum of the physical address of the previous data entry and the difference between the logical address to be retrieved and the logical address of the previous data entry.

3. Apparatus for interfacing a data storage device including an array of a plurality of memory elements, with a logical address bus for carrying a plurality of logical address data for identifying data stored in said memory device, said apparatus comprising:
   a store for storing a plurality of data entries, each of said data entries comprising a look up logical address value that is a logical address stored in said store and a look up physical address value, said look up physical address value corresponding to a physical location of one or more said memory elements; and
   a processor for:
      (a) parsing said data entries in said data table, to read a look up logical address of each of a plurality of said data entries in response to receipt of a requested logical address;
      (b) comparing said look up logical address with said requested logical address;
      (c) continuing to parse said data translation table if said look up logical address is less than said requested logical address; and
      (d) if said look up logical address is less than said requested logical address, determining a corresponding respective physical address to said requested logical address as being said requested logical address, minus a look up logical address of a preceding data entry in said data translation table, plus a look up physical address corresponding to said preceding data entry in said data translation table.

4. Apparatus for interfacing a data storage device including an array of a plurality of memory elements, with a logical address bus for carrying a plurality of logical address data for identifying data stored in said memory device, said apparatus comprising:
   a store for storing a plurality of data entries, each of said data entries having an index number, a logical address value and a physical address value, said physical address value corresponding to a physical location of one or more of said memory elements; and a processor for:

(a) detecting at least one defective memory element;

(b) locating, in said store, a pair of entries, that define a range of physical address encompassing the address of the defective memory element;

(c) inserting two additional entries in said store between said pair of entries;

(d) creating a first additional data entry in said store, said first additional data entry comprising a logical address which corresponds to the first defective, element of the group of defective elements and a physical address being that of a group of previously unused (spare) storage elements; and (e) creating a second additional data entry in said store, said second data entry comprising the logical address corresponding to the physical address subsequent to the highest addressed element of the group of defective elements and that same physical address as the physical address.

5. A memory storing a program for enabling a processor to convert between a logical address of a data storage device, and a physical address corresponding to individual memory elements in said data storage device, the computer being arranged to be used with a store for storing address data describing a plurality of logical addresses and a plurality of said physical addresses, wherein each said logical address corresponds to a respective physical address and is assigned an index value, the program being in the memory causing the computer to:

(a) read logical address request data describing a logical address of data to be retrieved;

(b) read said stored address data and compare said read logical address with a said stored logical address data at a first said index value;

(c) increment said index value if said logical address of said data to be retrieved is greater than or equal to a look up logical address corresponding to said index of said data entry;

(d) repeat steps (a), (b) and (c); and (e) determine a physical address corresponding to said logical address to be retrieved as being the sum of the physical address of the previous data entry and the difference between the logical address to be retrieved and the logical address of the previous data entry.

6. A memory storing a program for enabling a processor to interface a data storage device having an array of a plurality of memory elements, with a logical address bus for carrying a plurality of logical address data for identifying data stored in said memory device, the computer being arranged to be used with a store for storing a plurality of data entries, each of said data entries comprising a look up logical address value that is a logical address stored in said store and a look up physical address value, said look up physical address value corresponding to a physical location of one or more said memory elements, the program stored in the memory causing the computer to:

(a) parse said data entries in said data table to read a look up logical address of each of a plurality of said data entries upon receipt of a requested logical address;

(b) compare said look up logical address with said requested logical address;

(c) continue to parse said data translation table if said look up logical address is less than said requested logical address; and (d) if said look up logical address is less than said requested logical address, determining a corresponding respective physical address to said .requested logical address as being said requested logical address, minus a look up logical address of a preceding data entry in said data translation table, plus a look up physical address corresponding to said preceding data entry in said data translation table.

7. A memory storing a program for enabling a processor to interface a data storage device having an array of a plurality of memory elements, with a logical address bus for carrying a plurality of logical address data for identifying data stored in said memory device, the computer being arranged to be used with a store for storing a plurality of data entries, each of said data entries comprising an index number, a logical address value and a physical address value, said physical address value corresponding to a physical location of one or more said memory elements, the program stored in the memory causing the computer to:

(a) detect at least one defective memory element;

(b) locate, within said store, a pair of entries which define a range of physical addresses encompassing the address of the defective memory element;

(c) insert two additional entries in said store between said pair of entries;

(d) create a first additional data entry in said store, said first additional data entry having a logical address which corresponds to the first defective element of the group of defective elements and a physical address being that of a group of previously unused or spare storage elements; and (e) create a second additional data entry in said store, said second data entry having the logical address corresponding to the physical address subsequent to the highest addressed element of the group of defective elements and that same physical address as the physical address.

* * * * *